United States Patent [19]
Matsuura

[11] Patent Number: 6,164,673
[45] Date of Patent: Dec. 26, 2000

[54] SUSPENSION CONTROL FOR ALL TERRAIN VEHICLE

[75] Inventor: Tatsuya Matsuura, Iwata, Japan

[73] Assignee: Yamaha Hatsudoki Kabushiki Kaisha, Shizuoka-ken, Japan

[21] Appl. No.: 09/338,299

[22] Filed: Jun. 22, 1999

[51] Int. Cl.[7] .................................................. B60G 17/00
[52] U.S. Cl. .............................. 280/124.101; 280/124.102
[58] Field of Search ..................... 280/124.101, 124.102, 280/124.179

[56] References Cited

U.S. PATENT DOCUMENTS

| | | | |
|---|---|---|---|
| 1,641,472 | 9/1927 | Brown | 280/124.102 |
| 3,049,359 | 8/1962 | Geyer | 280/124.101 |
| 3,411,806 | 11/1968 | Bellairs | 280/124.179 |
| 4,666,015 | 5/1987 | Matsuda et al. | 280/124.179 |
| 4,997,201 | 3/1991 | Schaible | 280/124.179 |

*Primary Examiner*—Kenneth R. Rice
*Attorney, Agent, or Firm*—Knobbe, Martens, Olson & Bear LLP

[57] ABSTRACT

An all terrain vehicle has an adjustable suspension system. The adjustable suspension system features a first spring and a second spring. An intermediate member is positioned between the two springs and may travel in an axial direction along with at least a portion of one of the springs. A travel limiting member, movable by a cam and follower system, is positioned relative to the intermediate member such that the travel limiting surface may stop the movement of the intermediate member thereby disabling at least one of the first and second springs. The cam and follower mechanism is operated via a shifting lever positioned within a recess proximate a seat of the all terrain vehicle and in a location protected from the undercarriage of the all terrain vehicle.

18 Claims, 8 Drawing Sheets

SUSPENSION CONTROL FOR ALL TERRAIN VEHICLE

BACKGROUND OF THE INVENTION

1. Field of the Invention

The present invention generally relates to controllable suspension systems for all terrain vehicles. More particularly, the present invention relates to controllable suspension systems wherein a plurality of springs are selectively enabled or disabled to alter an effective spring constants and the overall rigidity of the suspension systems.

2. Description of Related Art

All terrain vehicles are becoming a workhorse in a variety of applications. In addition, these same all terrain vehicles are often operated by one or more operators for recreational purposes. The ride of the vehicle is often configured for use in a single type of terrain. However, in use, the same vehicle may encounter both smooth and level terrain and rough and rocky terrain in short time intervals. As a result of such a compromised suspension system, the vehicle may handle poorly in one type of environment relative to the other.

Furthermore, the vehicle may encounter a variety of loading conditions depending upon the number of operators and the weight being hauled or towed by the vehicle. Again, the vehicle is often configured to have a certain type of ride based upon an average weight anticipated as being carried. The compromised solution may result in a overly stiff ride for light riders and an overly soft ride for heavier or multiple riders.

Moreover, as all terrain vehicles are typically operated in muddy environments, it is not uncommon for the vehicle itself to be covered with the mud encountered in the environment of use. Accordingly, vehicles having an adjustable spring assembly, such as those requiring appropriate pretensioning of the spring to alter handling characteristics, do not lend themselves to rapid changes in the field. Moreover, working on such systems may require the rider to dismount from the vehicle into wet or muddy operating conditions. The systems may only be accessible from below the vehicle or through tight access channels. Therefore, frequent adjustment of such suspension systems was neither desirable nor possible.

Also, systems having operators located within the rear fender were often covered with mud and debris thrown from the tires. Should the operator be covered with mud, altering the spring characteristics was likely fraught with difficulty and inconvenience. Moreover, as the working components of the spring characteristic adjusting mechanism were covered with mud, the mud and water may interfere with the operation of the mechanism itself. Accordingly, the adjustment mechanism became a maintenance nightmare and troublesome to operate.

SUMMARY OF THE INVENTION

Accordingly, a controllable suspension system is desired wherein the operator is shielded from the undercarriage of the all terrain vehicle. Moreover, the suspension system should feature a substantially enclosed adjustment mechanism whereby the moving components may be substantially protected from environmental hazards encountered while riding on rough and muddy terrain. Furthermore, it is desired that the adjustable suspension system not require a preloading of a coil spring to adjust the handling characteristics of the all terrain vehicle. Preferably, the handling characteristics may be adjusted by implementing a plurality of springs such that one or more of the plurality of springs may be disabled to alter the spring constant associated with the suspension system at various loads.

Accordingly, one aspect of the present invention involves an adjustable suspension member. The adjustable suspension member comprises a first end, a second end and an intermediate member. A first spring member is interposed between the first end and the intermediate member. A second spring member is interposed between the second end and the intermediate member. An adjustable travel limiting surface is manually movable relative to the first end such that the spacing between the adjustable travel limiting surface and the intermediate member may be adjusted. Furthermore, the intermediate member is preferably movable under applied loads relative to the first end such that the intermediate member may contact the travel limiting member to generally disable the first spring member when a predetermined load is exceeded.

Another aspect of the present invention involves an all terrain vehicle comprising a frame, a seat mounted to the frame and a pair of rear wheels pivotally coupled to the frame. A space is defined between the seat and one of the pair of rear wheels with an adjustable shock absorbing member mounted between the rear wheels and the frame such that a travel of the rear wheels relative to the frame may be limited by the adjustable shock absorbing assembly. A control operator is mounted in the space between the seat and one of the pair of rear wheels. The control operator is connected to an adjustable shock absorbing member. The adjustable shock absorbing member generally comprises a pair of springs and an intermediate member interposed between the pair of springs. A cam member is mounted for rotation within the adjustable shock absorbing member and a follower member has a lower face and is mounted for translation within the adjustable shock absorbing member, such that as the cam member is rotated, the follower member is axially adjusted within the adjustable shock absorbing member and the spacing between the lower face and the intermediate member may thereby be varied so that the deflection of one of the springs may be limited.

Yet another aspect of the present invention involves an all terrain vehicle comprising a frame and at least one wheel pivotally coupled to the frame. An adjustable suspension component has an upper end secured to the frame and a lower end connected to the wheel. The adjustable suspension component also has a buffering arrangement wherein a portion of the buffering arrangement cannot deform when an actual load exceeds a predetermined load, thereby altering the cushioning characteristics of the buffering arrangement under varying loads.

A further aspect of the present invention involves an all terrain vehicle having an adjustable suspension system. The adjustable suspension system generally comprises a first spring and a second spring. The suspension system has a first spring constant when the first spring and the second spring operate in concert and has a second spring constant when one of the first spring or the second spring is disabled and the other of the first spring or the second spring operates alone.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
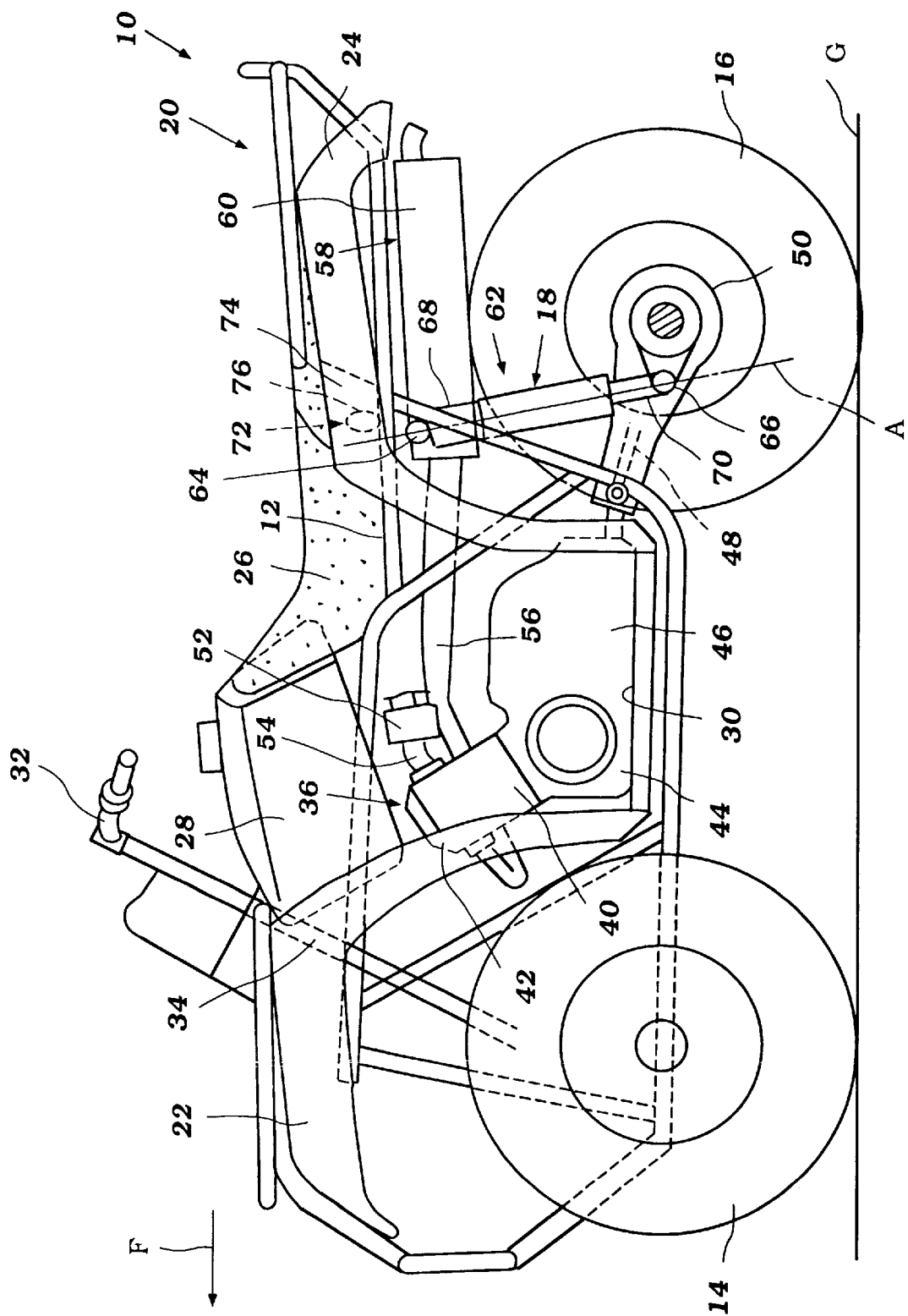
FIG. 1 is a left side view of an all terrain vehicle having features, aspects and advantages in accordance with the present suspension control system, with some internal components illustrated with hidden lines.
Figure 2:
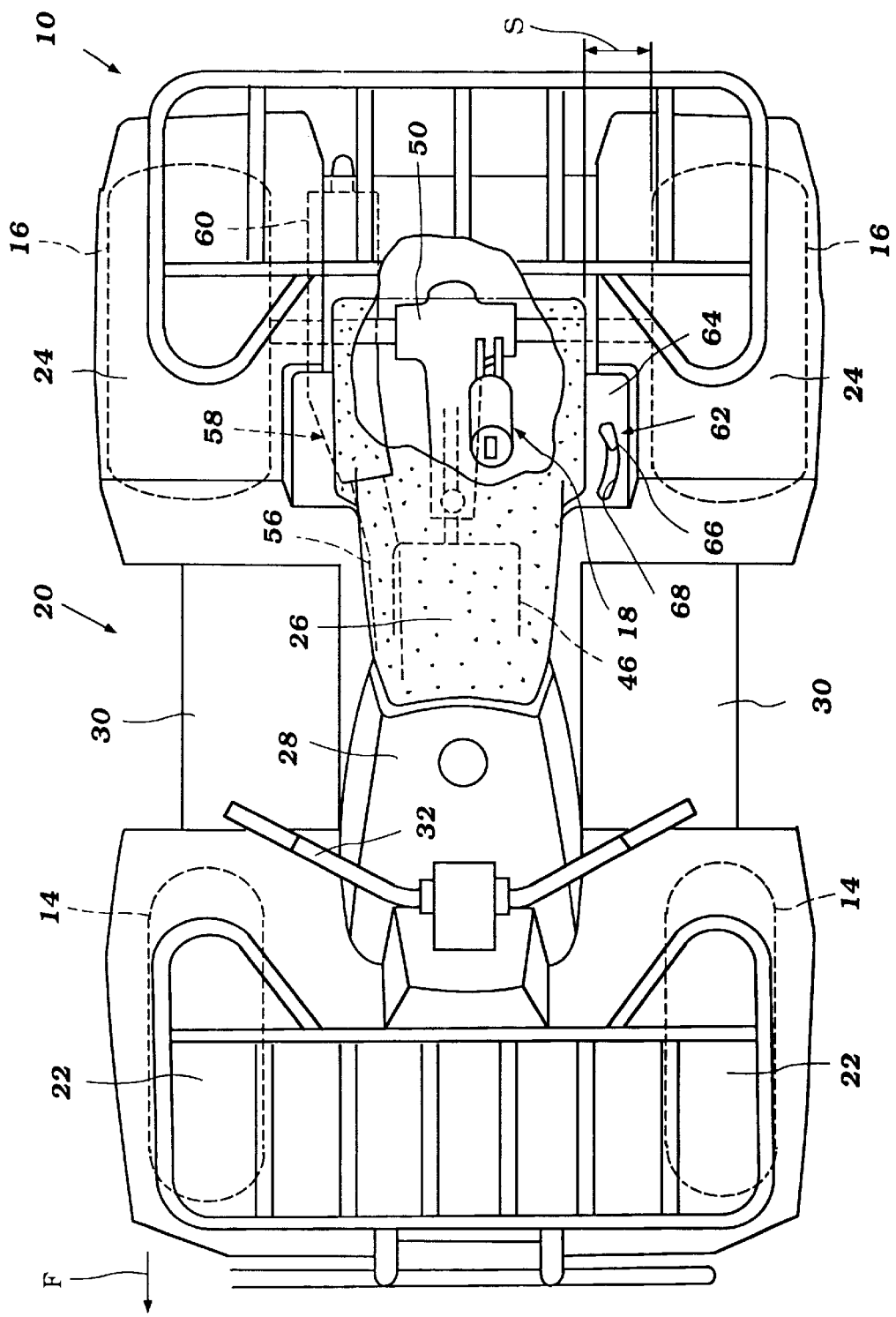
FIG. 2 is a top view of the all terrain vehicle of FIG. 1, with some internal components illustrated with hidden lines.

With initial reference to FIGS. 1 and 2, an all terrain vehicle of the four-wheel type featuring an embodiment of the present suspension control system is identified generally by the reference numeral 10. The vehicle 10 is generally propelled in a forward direction, indicated by the arrow F, but may also be propelled rearward as is well known. The vehicle 10, as will be described, illustrates only a typical environment in which the present invention may be found. For that reason, many details of the vehicle 10, which are not necessary to understand the construction and operation of the present suspension control system, will be omitted; however, the omitted details are considered well understood by those of skill of the art or are considered to be replaceable by many suitable components.

In one embodiment, the vehicle 10 generally includes a welded-up frame assembly 12, a pair of front wheels 14 and a pair of rear wheels 16. Preferably, each of the wheels 14, 16 includes a low-pressure balloon-type of tire designed for off-road use. The wheels 14, 16 are mounted to the frame in any suitable manner.

The travel of each of the wheels 14, 16 is controlled through corresponding front and rear suspension systems. The front suspension system may be considered to be conventional and the travel of the front wheels 14 may be controlled independently from one another. For instance, the front suspension system may comprise a pair of A-arm mechanisms. Further description of the front suspension system in unnecessary for an understanding of the present suspension control system; however, the rear suspension system 18 will be described in detail below.

The vehicle 10 also includes a body 20. The body 20 is generally comprised of a front fender assembly 22, a rear fender assembly 24, a seat 26 and a fuel tank 28. Each of the body components 22, 24, 26, 28 are carried by the frame assembly 12 in any suitable manner. The front fender assembly 22 is generally positioned over the front wheels 14 and attached to the frame assembly 12 with threaded fasteners. Rearward of the front fender assembly 22 are the fuel tank 28 and the seat 26. The rear fender assembly 24 is generally positioned behind the seat 26 and over the rear wheels 16. The rear fender assembly is preferably attached to the frame assembly 12 with threaded fasteners.

A pair of foot boards 30 extend between a portion of the front fender assembly 22 and a portion of the rear fender assembly 24. The foot boards are desirably easily removed from the frame assembly 12.

With continued reference to FIGS. 1 and 2, the seat 26 preferably accommodates a single rider seated in a generally straddle fashion (i.e., having one leg on each of the foot boards 30) or a plurality of riders seated in a generally tandem-straddle fashion (i.e., one behind the other). An access opening or storage compartment (not shown) may be at least partially arranged beneath the seat 26. Thus, the seat 26 or a portion of the seat 26 may be mounted to a removable access opening cover such that the seat 26 or the portion of the seat 26 may be removed or opened about a hinge to provide easy access to an engine compartment, storage compartment or other components, such as, for instance, an air cleaner or the like.

The fuel tank 28 is preferably interposed between a forward end of the seat 26 and a handle bar assembly 32. The handle bar assembly 32 may carry the throttle controls, the choke controls and other operator controls. The illustrated handle bar assembly 32 is connected to a front steering mechanism via a steering column 34. The steering column 34 and the handle bar assembly 32 operate to steer the front wheels 14 in any suitable manner.

An internal combustion engine, indicated generally by the reference numeral 36, powers the vehicle 10. As is known, the engine 36 may comprise any number of engine configurations. For instance, the engine 36 may operate on the two-stoke principle or the four-cycle principle. The engine 36 have as few as one cylinder or more than two cylinders. In the illustrated embodiment, the engine 36 is a four-cycle one-cylinder power plant. The engine 36 preferably drives both the front wheels 14 and the rear wheels 16 through a transmission 38, which may be configured to shift between two-wheel drive and four-wheel drive modes.

The engine 36 generally comprises a cylinder block 40 having a cylinder head 42 connected thereto and cooperating therewith to define one cylinder in the illustrated embodiment. A combustion chamber is defined by a cylinder wall within the cylinder block 40, a recessed area in the cylinder head 42 and a top of a piston (not shown). Preferably, the engine 36 is tilted or inclined so that the combustion chamber (not shown) has an axial centerline I which is offset in a first direction from a vertical axis. This arrangement advantageously keeps the vertical profile of the engine 36 small.

The piston (not shown) is desirably mounted for reciprocation within the cylinder bore (not shown) and is connected to a throw of a crankshaft (not shown) via a connecting rod (not shown), as is well known in the art. The crankshaft (not shown) is preferably constrained for rotational movement with a crankcase 44. A transfer case 46 is mounted to the engine 36 below the crankcase 44. The transfer case 46 houses a transmission which provides the necessary rotational power to selectively drive all four wheels or any pair of the wheels in a known manner. For instance, a rear drive shaft 48 transmits the rotational power from the transfer case 46 to the rear wheels 16 through a differential gearing arrangement 50.

The illustrated engine 36 is also provided with an air induction system. Air is pulled into a carburetor 52 through an air induction inlet (not shown). The air may preferably pass through an air cleaner (not shown), which may be interposed between the air inlet (not shown) and the carburetor 52. Within the carburetor 52, the air is mixed with fuel in a known manner. As will be recognized, the present invention, while illustrated with a carbureted engine, may also find utility with a fuel-injected engine (i.e., either indirect injection into the air stream or direct injection into the cylinder or combustion chamber). The air-fuel charge is then introduced to the cylinder (not shown) through an intake pipe 54.

Within the cylinder, the air-fuel charge is supplied to the combustion chamber (not shown) for ignition in a known manner. Following combustion, the spent gases may be passed to the atmosphere through an exhaust pipe 56 of an exhaust system 58. The spent gases pass through the exhaust pipe 56 into a silencer 60, which is preferably mounted below the seat 26.

With continued reference to FIGS. 1 and 2, the present suspension system 18 will be introduced and discussed in detail. As is known, the travel of the rear wheels is generally limited by the rear suspension system 18. The rear suspension system 18 generally comprises a swing arm (not shown) which is pivotably connected to the frame assembly 12. In the illustrated embodiment, an adjustable shock absorbing assembly 62 extends from an upper support shaft 64 to a lower support shaft 66. The upper support shaft 64 preferably connects an upper end 68 of the adjustable shock absorbing assembly 62 to the frame assembly 12. The lower support shaft 66 connects a lower end 70 of the adjustable shock absorbing assembly 62 to the swing arm or another member connected to the swing arm, such as the differential gearing arrangement 50. The shock absorbing assembly 62 is preferably inclined in a forward direction.

As shown in FIG. 1, a suspension control system operator 62 is preferably positioned within a recess 64 in the rear fender assembly 24. More preferably, the suspension control system operator 62 is arranged within a space defined between the rear wheel 16 and the seat 26. Even more preferably, as illustrated in FIG. 2, the suspension control system operator 62 is arranged within a space S defined between the inner face of the rear wheel 16 and the seat 26.

Figure 4:
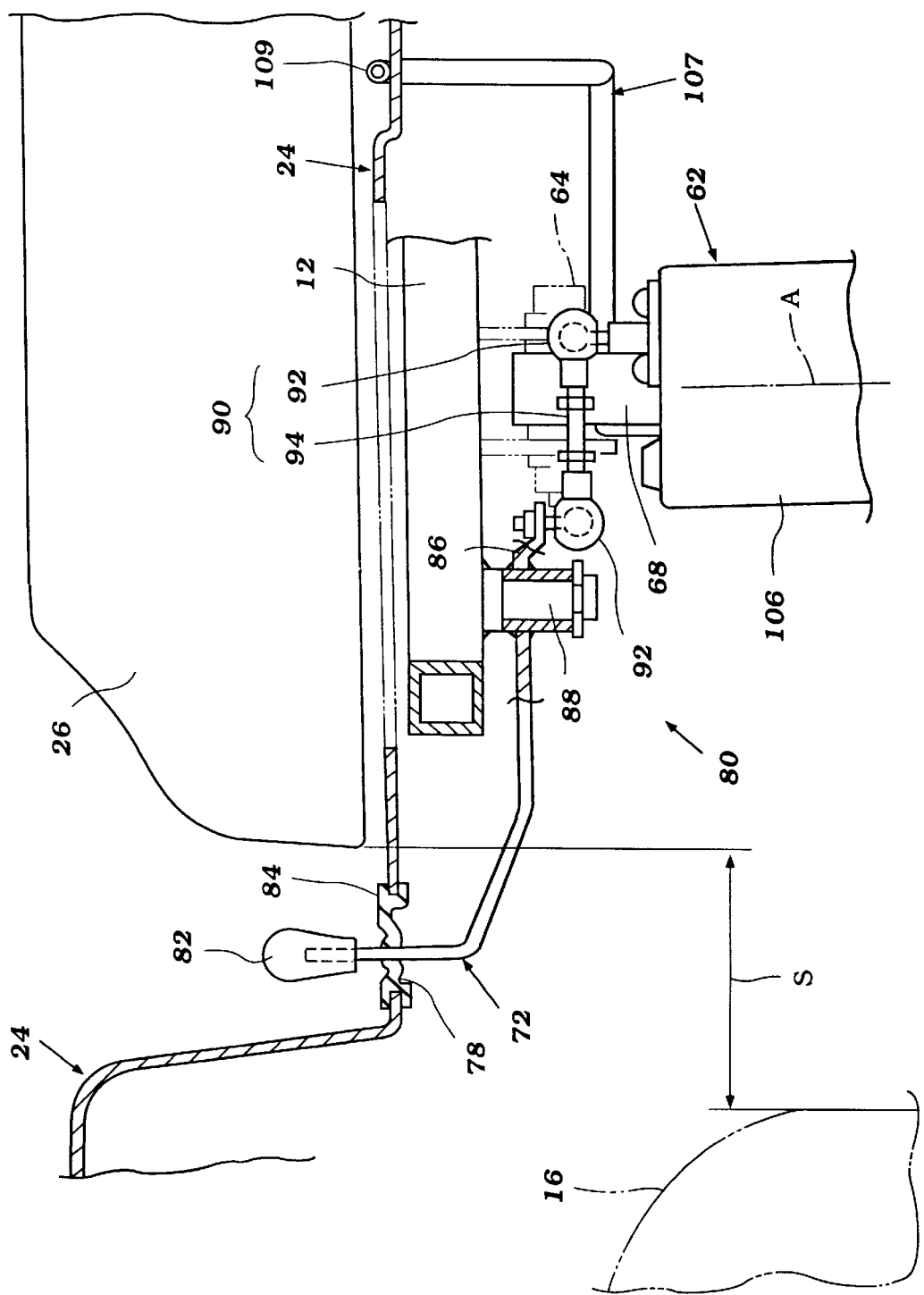
FIG. 4 is a broken-out section in elevation view of the all terrain vehicle of FIG. 1 illustrating the same portion of the present suspension control system as illustrated in FIG. 3.

As shown in FIG. 2, the illustrated suspension system control operator 62 generally comprises a lever 66 which extends upward through a hole or slot 68 in the recess 64 of the rear fender assembly 24. With reference now to FIG. 4, the lever 66 forms at least a portion of a linkage 80 used to adjust the adjustable shock absorbing assembly. To shield an operator handle portion 82 from mud, dirt and other environmental debris frequently encountered when operating an all terrain vehicle, an upper end of the illustrated lever 72 passes through a sealing member 84 that substantially closes the slot 78 to reduce the amount of environmental debris which may be thrown upward through the slot from within the rear fender assembly 24. The sealing member 84 is desirably manufactured from a rubber, soft plastic and the like and preferably has a pair of substantially parallel lips to form a gasket-like structure, which is form-fit within the slot 78.

With continued reference to FIG. 4, the lever 72 extends inward under the seat 26 toward a longitudinal center plane of the vehicle 10. As shown best in FIG. 3, the illustrated lever 72 includes a short actuator finger 86 that extends at an angle to the balance of the lever 72. A pivot shaft 88 is interposed between the illustrated actuator finger 86 and the balance of the lever 72 such that displacement of the lever handle 82 along a substantially straight line results in arcuate travel of the actuator finger 86. As will be recognized by those of skill in the art, any number of movements, whether arcuate or linear, may be used such that movement of the handle 82 results in a corresponding movement at the other end of the lever 76. Moreover, the lever may be a single straight component, may include a dog-leg such as the illustrated lever or may be otherwise formed in any suitable configuration. Furthermore, the illustrated construction results in an increase of leverage available at the working end of the lever 76.

The illustrated actuator finger 86 is coupled to the adjustable shock absorber though the balance of the linkage 80. In the illustrated linkage 80, an interlock 90 is formed of a plurality of ball joints 92 and links 94 which are positioned between the ball joints 92.

Figure 5:
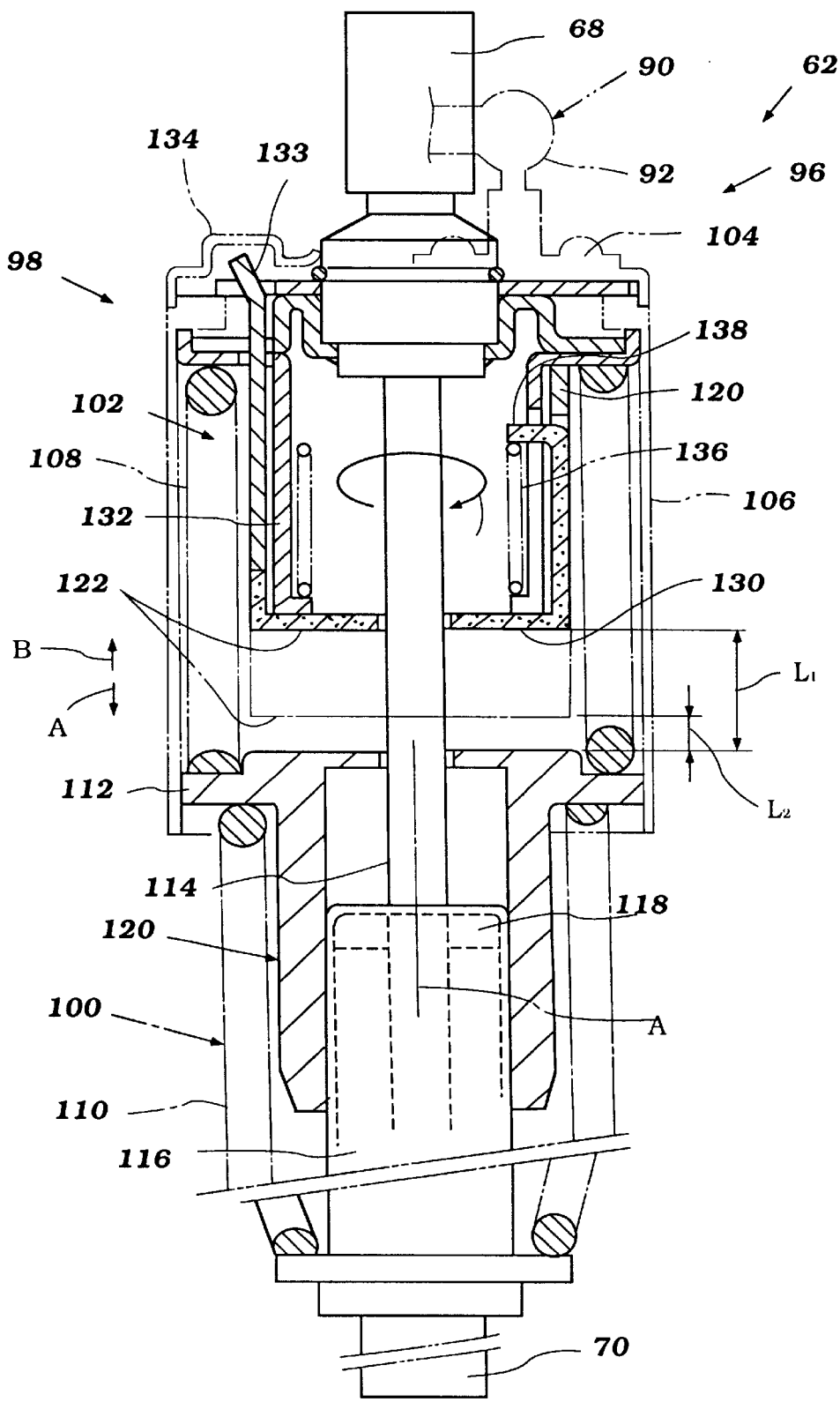
FIG. 5 is a partially sectioned elevation view of an adjustable suspension member used in the present suspension control system, with some elements illustrated with hidden lines and some elements illustrated with phantom lines.

With reference now to FIG. 5, an embodiment of an adjustable shock absorber member 96 will be described in detail. Generally, the illustrated shock absorber 96 comprises an outer casing 98, a buffering component 100 and an adjusting mechanism 102. The outer casing 98 preferably includes a cylindrical cover 106 and a rotatable capping member 104, which is rotatable relative to the balance of the casing 98 and a majority of the shock absorber 96. As best illustrated in FIG. 5, the capping member 104 preferably encases a portion of the adjusting mechanism 102, discussed in detail below, such that the capping member 104 may impart a rotational movement to a portion of the adjusting mechanism 102. The illustrated cover 106 shrouds the moving components of the adjusting mechanism 106 from a majority of the dirt and debris which may be thrown within the rear fender assembly 24. The cover 106 also may act as a guide to restrict the amount of outward bowing of at least a portion of the buffering component 100 in some embodiments.

Figure 3:
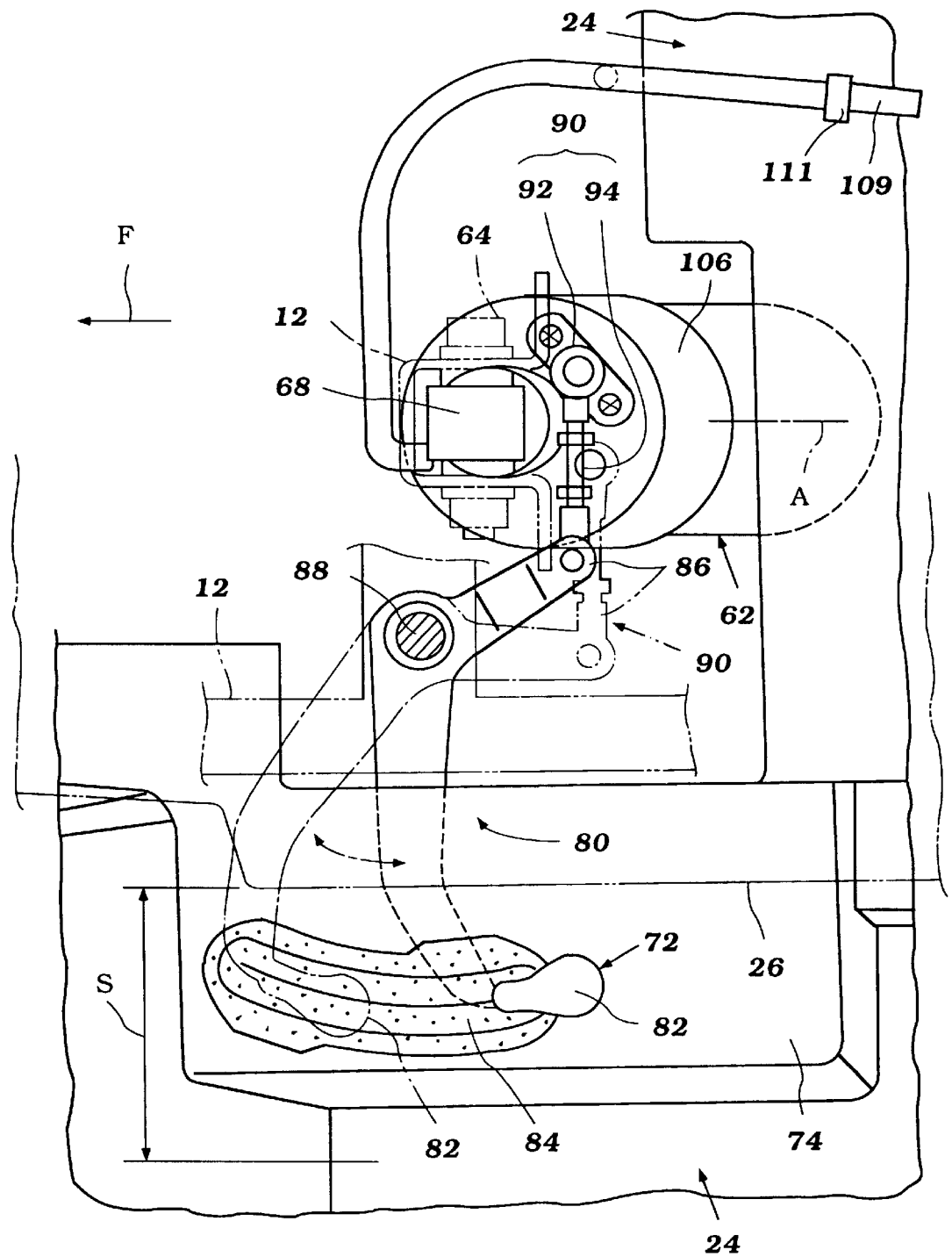
FIG. 3 is a broken-out section in plan view of the all terrain vehicle of FIG. 1 illustrating a portion of the present suspension control, with some internal components illustrated with hidden lines and some moving components illustrated in a second position with phantom lines.
Figure 6:
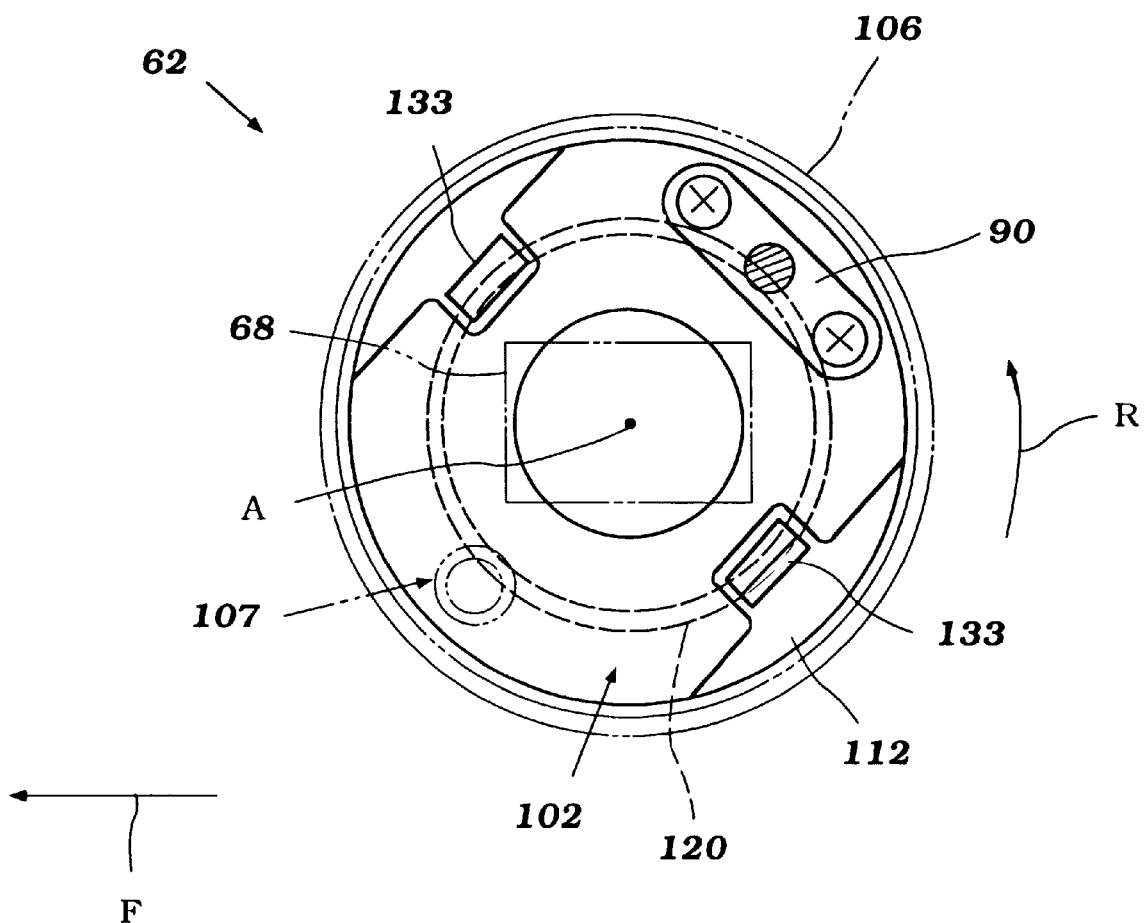
FIG. 6 is a top view of the adjustable suspension member of FIG. 5.

With reference to FIGS. 3, 4 and 6, a breather pipe arrangement is depicted. Because the illustrated shock absorber 96 has a substantially enclosed chamber that frequently encounters changes in pressure because of rapidly translating internal components, a breather pipe 107 extends through one of the walls of the shock absorber. In the illustrated embodiment, the breather pipe 107 extends through the top of the shock absorber 96 to be better protected and shielded from debris thrown upward into the rear fender assembly 24 by the rear wheels 16. The breather pipe 107 may also be positioned on a side or the bottom of shock absorber 96 in some embodiments. As best shown in FIG. 4, a distal end 109 of the breather pipe 107 is preferably positioned between a lower surface of the seat 26 and an upper surface of the rear fender assembly 24 and clipped in place by a fastener 111. Such placement may protect the pipe 107 from plugging by mud and the like. This placement may also protect the shock absorber from an ingress of water which could occur in some lower positions under extreme operating conditions. It should be noted that a water trap could also be incorporated to limit the likelihood of large amounts of water entering the chamber defined within the shock absorber housing.

With continued reference to FIG. 5, the buffering component 100 generally comprises an upper spring 108 and a lower spring 110. The two springs 108, 110 are preferably coil springs. In the illustrated embodiment, the first spring 108 has a first a diameter wire and a first diameter coil, while the second spring 110 has a smaller diameter wire and a smaller diameter coil. The relative spring constants may also vary between the two springs 108, 110 but need not. In the illustrated embodiment, the first spring has a smaller spring constant than the second spring. The material selection may also affect the relative spring constants. The equation is $k=d^4G/(8D^3N)$ where k=spring constant, d=diameter of wire, D=mean diameter of coil, G=modulus of rigidity for a given material, and N=number of coils. The effect of two springs configured to work together, such as those as illustrated in FIG. 5, is to increase the effective length or reduce the overall spring constant. Thus, the combined springs 108, 110 result in a lower overall spring constant as compared to only one of the two springs 108, 110 when segregated for movement. Thus, a variable spring constant effect can be amplified or reduced by varying the relative spring constants with respect to one another to achieve a desired overall effect.

In the illustrated embodiment, the two springs 108, 110 are separated by an intermediate member 112. As illustrated, the intermediate member 112 has a central through hole and a bore extending along a longitudinal axis A of the shock absorber 96. The through hole accommodates a piston rod 114 while the bore accommodates a hydraulic cylinder 1 16. The piston rod 114 is connected to a piston 118 which operates within the hydraulic cylinder 116 to form a hydraulic damper 120. The hydraulic damper 120 may be of any suitable configuration, such as, for example, but without limitation, a perforated plate drawn than an oil bath.

With continued reference to FIG. 5, the illustrated adjusting mechanism will be explained. The present adjusting mechanism allows an operator to adjust the degree to which one of the springs works and, therefore, allows the operator to selectively control the spring characteristics over a broad range of loading scenarios. In the illustrated adjusting mechanism 102, the operator controls the range of movement of the upper spring 108 such that the effective length of the upper spring portion of the buffering component is controlled. By controlling this length, the operator can alter the characteristics by invoking the assistance of only a portion of the entire buffering component. This in turn effectively varies the spring constant as will be explained below.

Figure 7:
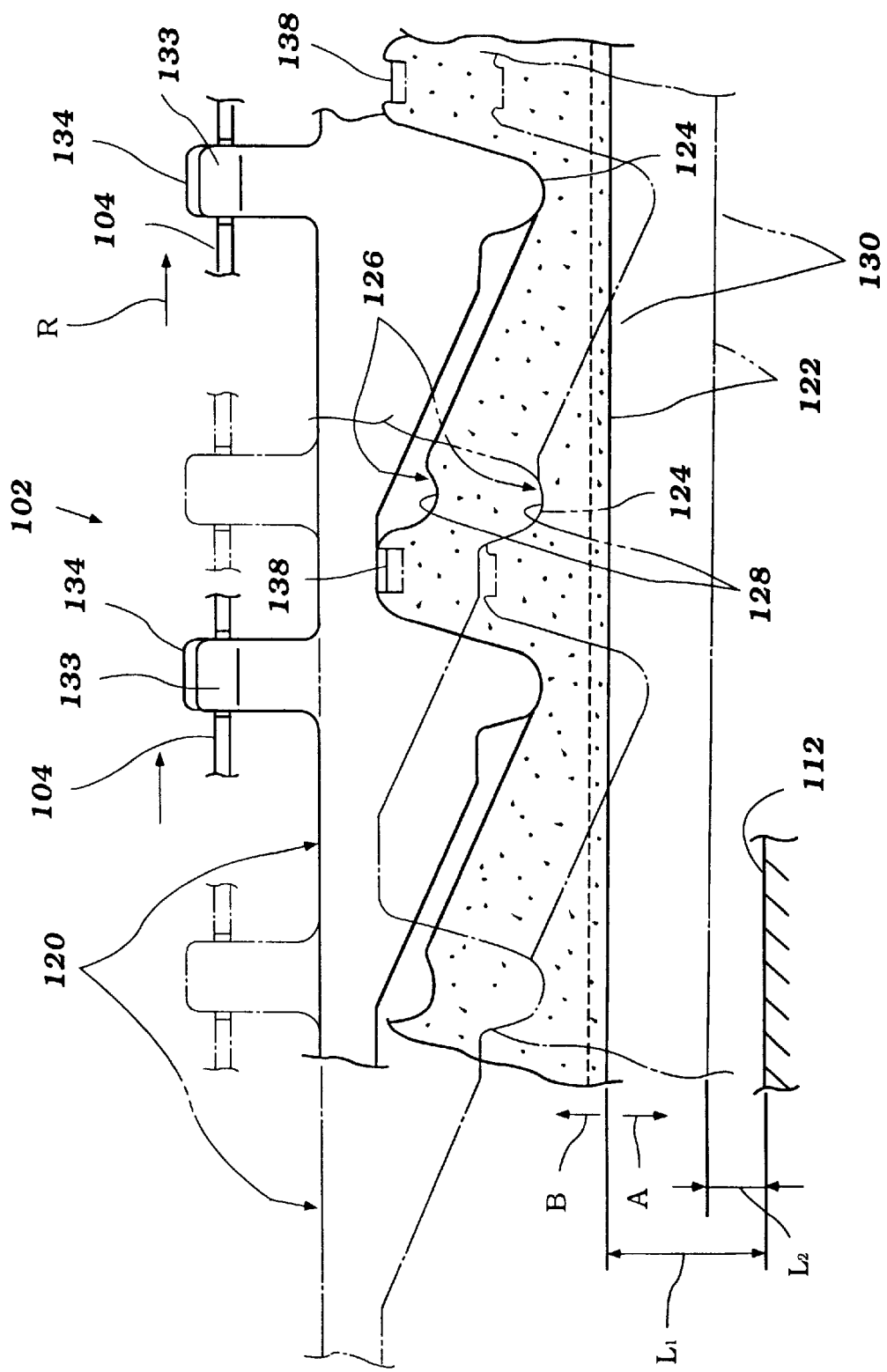
FIG. 7 is a developed view of the cam surfaces and follower surfaces of the adjustable suspension member of FIG. 5; and, FIG. 8 is a graphical illustration of the effect created within the suspension system by adjusting the adjustable suspension member in accordance with certain features, aspects and advantages of the present suspension control system.

The illustrated adjusting mechanism 102 generally comprises a cylindrical cam member 120 and a cooperating cylindrical cam follower member 122. With reference to FIG. 7, a developed illustration of the cam member 120 and the follower member 122 are shown in a first position and in a second position (illustrated in phantom lines). The illustrated cam member 120 includes at least one dog 124 that cooperates with at least one corresponding catch 126 in the follower member 122 to provide two distinct locking positions for the cam member 120 relative to the follower member 122. Preferably, the cam member 120 includes two dogs 124 and two catches 126. The dogs 124 are desirably configured and arranged to lock the cam member 120 in position relative to the follower member 122 when the dogs 124 drop into the concave portions 128 of the catches 126. Applying an initial restoring force to the cam member 120 allows the dogs 124 to be displaced from the catches and the cam member 120 and follower member 122 return to their original position.

As illustrated in both FIG. 5 and FIG. 7, rotation of the illustrated cam member 120 preferably results in downward movement of the follower member 120 relative to the capping member 104. The downward movement of the follower member 122 positions a lower face 130 of the follower member 122 closer to the intermediate member 112. The two relative positions of the lower face 130 and the intermediate member 112 are shown as L1 and L2 with L1 being the first position and L2 being the second position in the illustrated embodiment. Other relative positions are also contemplated, such as, for example, but without limitation, any number of intermediate positions.

The adjusting mechanism also includes an inner cylindrical guide member 132. The guide member 132 provides a generally cylindrical surface about which the cam member 120 may rotate. Moreover, as illustrated in FIG. 5, an extension 133 of the cam member 120 preferably extends upward to the capping member 104 such that the extension 133 is at least substantially encased within a pocket 134 of the capping member 104. This extension of the cam member 120 preferably passes through a slot in the guide member 132 which defines a generally arcuate travel path for the extension. With reference to FIG. 6, it can be seen that the illustrated shock absorber 96 utilizes two diametrically opposed extensions 120, and, therefore, also utilizes two cam surfaces which are diametrically opposed as well. It is anticipated that any suitable number of cam surfaces can be used such that the cam surface and the follower achieve similar relative movement. For example, increasing the number of surfaces, and therefore contact surface area, may result in an increased feeling of strength and rigidity.

A biasing member 136, such as a compression spring for example, is constrained between a tang 138 of the follower member 122 and an inwardly extending lip of the guide member 132. The spring exerts a force which tends to keep the tang 138 away from the inwardly extending lip of the guide member 132 in the illustrated embodiment Accordingly, the force tends to bias the adjusting mechanism into the first position. When the cam member 120 drives the follower member 122 into the second position, the relative positions are maintained by the locking action of the dog and catch combinations. When disengaged, the biasing member 136 tends to return the follower member 122 back to the first position. Of course, one may reverse the bias or utilize any suitable biasing technique. In some embodiments, for simplicity, the biasing mechanism may be excluded.

Figure 8:
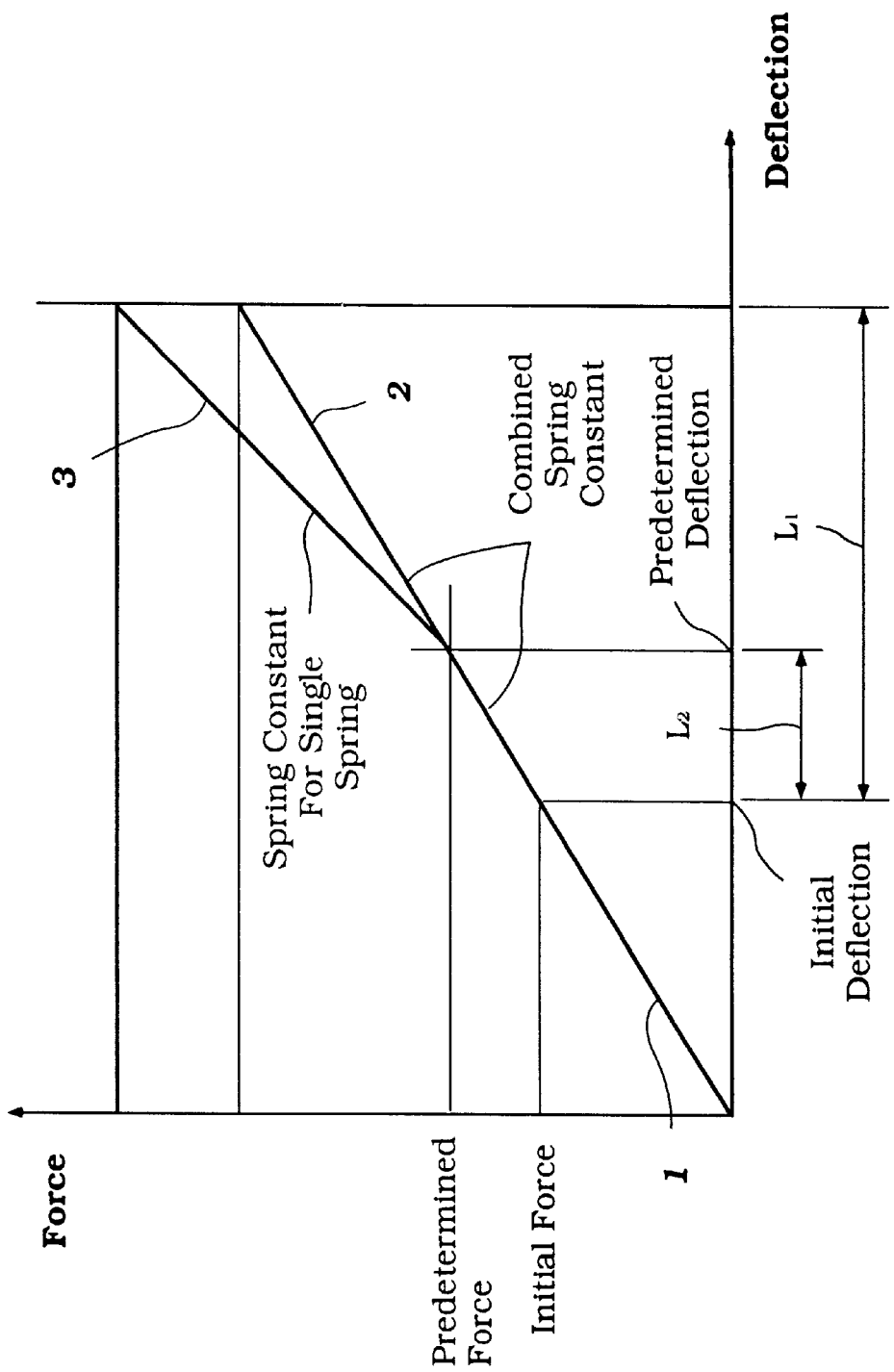

In use, the illustrated lever 76 is predisposed in a rearmost position. This lever position corresponds to the linkage position illustrated in solid lines in FIG. 3 and to the relative cam and follower positions illustrated in solid lines in FIG. 7. Accordingly, in the predisposed position, the lower face 130 is spaced from the intermediate member 112 by the distance L1. With reference to FIG. 8, this spacing allows the adjustable shock absorbing assembly 62 to follow the characteristic curve substantially as defined by lines 1 and 2 of FIG. 8. The spacing allows the upper spring 108 to deflect through a range defined by L1 and allows the upper spring 108 to absorb energy throughout its deflection because the lower face 130 does not contact the intermediate member in this range. Accordingly, the adjustable shock absorbing assembly 62 reflects the characteristics of the combined spring lengths and spring constants.

On the other hand, movement of the illustrated lever 76 into a forward position, results in the linkage pulling the illustrated capping member 104 in a clockwise rotation. The extension 133 of the illustrated cam member 120, which extension 133 is connected to the capping member 104, also travels in a clockwise direction. Accordingly, the cam member 120 rotates about the guide member 132 and the lower face 130 of the follower member 122 is moved downward due to the relative movement between the non-rotating follower member 122 and the rotating cam member 120. The movement of the lower face 130 of the follower member results in the gap between the lower face 130 and the intermediate member 112 being substantially closed. The spacing is indicated by L2 in FIGS. 5 and 7.

In this position, when the upper spring 108 deflects a distance L2, the lower face 130 comes into contact with the intermediate member 122. This contact at least substantially prevents further deflection of the upper spring 108 and may result in any remaining deflection being transferred to the lower spring 106 only. The effect of such a transfer is to stiffen the adjustable shock absorbing member 62 following the initial deflection represented by L2. As illustrated in FIG. 8, the lower spring 106 begins to work alone when a predetermined force is exceeded. When the lower spring 106 works alone, an increase in spring constant may be experienced. Thus, a greater force results in less deflection under the single spring environment in the illustrated embodiment.

In order to return to the initial positioning, the illustrated lever 76 is manually urged rearward with sufficient force to disengage the dogs 124 from the catches 126 and the biasing member 136 moves the follower member 122 upward. It is envisioned that other biasing methods could also be used. Moreover, it is envisioned that a non-biased lever could be used such that both positions would be positively selected.

Accordingly, the present suspension control system desirably enables adjustment of the suspension system. For instance, when desired, the adjustable shock absorbing assembly may be set in the first position to accommodate a single rider. As is known, a single rider typically will exert a lower maximum force as compared to more than one rider. Thus, when more than one rider, or another load increase, is anticipated, the suspension system may be stiffened by shifting the adjustable shock absorbing assembly into a second position. In other words, moving the operator either stiffens or softens the suspension system to accommodate various riding conditions.

Although the present invention has been described in terms of a certain embodiment, other embodiments apparent to those of ordinary skill in the art also are within the scope of this invention. For instance, it is envisioned that other spring arrangements, such as disabling the lower spring instead of the upper spring, are possible. Moreover, it is envisioned that relative movements of components can be altered to achieve the same or similar results. It is also contemplated that more than two positions could be used and more than two springs could comprise the shock absorber buffering component. For instance, one or two springs could be disabled similar to that described above to result in three position control. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An adjustable suspension member comprising a first end, a second end and an intermediate member, a first spring member being interposed between the first end and the intermediate member, a second spring member being interposed between the second end and the intermediate member, an adjustable travel limiting surface being manually moveable relative to the first end such that the spacing between the adjustable travel limiting surface and the intermediate member may be adjusted, and the intermediate member being movable under applied loads relative to the first end such that the intermediate member may contact the travel limiting member to generally disable the first spring member when a predetermined load is exceeded.

2. An all terrain vehicle comprising a flame, a seat being mounted to the frame, a pair of rear wheels being pivotably coupled to the frame, a space being defined between the seat and one of the pair of rear wheels, an adjustable shock absorbing assembly being mounted between the rear wheels and the frame such that a travel of the rear wheels relative to the frame may be limited by the adjustable shock absorbing assembly, a control operator being mounted in the space between the seat and one of the pair of rear wheels, the control operator being connected to an adjustable shock absorbing member, the adjustable shock absorbing member comprising a pair of springs, an intermediate member being interposed between the pair of springs, a cam member being mounted for rotation within the adjustable shock absorbing member, a follower member having a lower face and being mounted for translation within the adjustable shock absorbing member such that as the cam member is rotated, the follower member is axially adjusted within the adjustable shock absorbing member and the spacing between the lower face and the intermediate member may be varied so that the deflection of one of the springs may be limited.

3. The all terrain vehicle as set forth in claim 2, wherein a first position is defined when the lower face is firthest from the intermediate member and a second position is defined when the lower face is moved to a predetermined position closer to the intermediate member.

4. The all terrain vehicle as set forth in claim 3 further comprising a biasing member configured to return the follower member to the first position following movement to the second position.

5. The all terrain vehicle as set forth in claim 2, wherein the pair of springs each have approximately the same spring constant as the other.

6. The all terrain vehicle as set forth in claim 2, wherein one of the pair of springs is an upper spring and one of the pair of springs is a lower spring.

7. The all terrain vehicle as set forth in claim 6, wherein a deflection of the upper spring is limited by the lower face and the intermediate member.

8. The all terrain vehicle as set forth in claim 2, wherein the control operator is configured for rotation in a plane substantially parallel to a ground surface.

9. The all terrain vehicle as set forth in claim 2 further comprising a breather pipe which allows pressure equalization between an interior portion of the adjustable shock absorbing member and the atmosphere.

10. The all terrain vehicle as set forth in claim 9, wherein the breather pipe has an opening positioned beneath the seat.

11. The all terrain vehicle as set forth in claim 9 further comprising a rear fender assembly, the rear fender assembly having an upper surface, wherein the breather pipe has an opening vertically positioned between the seat and the upper surface of the rear fender assembly.

12. An all terrain vehicle comprising a frame, at least one wheel pivotably coupled to the frame and an adjustable suspension component, the adjustable suspension component having an upper end secured to the frame and a lower end connected to the wheel, the adjustable suspension component having a buffering arrangement wherein a portion of the buffering arrangement cannot deform when an actual load exceeds a predetermined load thereby altering the cushioning characteristics of the buffering arrangement under varying loads.

13. The all terrain vehicle as set forth in claim 12, the buffering arrangement including a first spring member, the first spring member having a first end fixed relative to the frame and a second end moveable relative to the frame, an intermediate member mounted proximate to the second end of the first spring member, the intermediate member capable of translation along an axis of the buffering arrangement and capable of moving only a predetermined amount toward the first end of the first spring member such that the deflection of the first spring member may be limited.

14. An all terrain vehicle having an adjustable suspension system, the adjustable suspension system comprising a first spring and a second spring, the suspension system having a first spring constant when the first spring and the second spring operate in concert and having a second spring constant when one of the first spring or the second spring is disabled and the other of the first spring or the second spring operates alone.

15. The all terrain vehicle of claim 14, wherein the first spring has a first diameter wire and a first diameter coil, the second spring has a second diameter wire and a second diameter wire and the first diameter wire is larger than the second diameter wire and the first diameter coil is larger than the second diameter coil.

16. The all terrain vehicle of claim 15, wherein the first spring has a first spring constant, the second spring has a second spring constant and the first spring constant is smaller than the second spring constant.

17. The all terrain vehicle of claim 16, wherein the first spring is capable of selective disablement such that the second spring operates alone.

18. The all terrain vehicle of claim 14, wherein the first spring and the second spring are capable of operation in concert for a predetermined displacement and wherein one of the first spring or the second spring operates alone for displacement beyond the predetermined displacement.

* * * * *

UNITED STATES PATENT AND TRADEMARK OFFICE
CERTIFICATE OF CORRECTION

PATENT NO.   : 6,164,673
DATED        : December 26, 2000
INVENTOR(S)  : Tatsuya Matsuura It is certified that error appears in the above-identified patent and that said Letters Patent is hereby corrected as shown below:

<u>Column 10,</u>
Line 3, "flame" should be -- frame --

Signed and Sealed this

Eighteenth Day of February, 2003

JAMES E. ROGAN
*Director of the United States Patent and Trademark Office*